F. R. JONES.
METHOD OF INDEXING IN GEAR CUTTING.
APPLICATION FILED NOV. 16, 1920.

1,438,528.  Patented Dec. 12, 1922.

INVENTOR.
Forrest R. Jones

Patented Dec. 12, 1922.

1,438,528

UNITED STATES PATENT OFFICE.

FORREST R. JONES, OF KNOXVILLE, TENNESSEE.

METHOD OF INDEXING IN GEAR CUTTING.

Application filed November 16, 1920. Serial No. 424,569.

*To all whom it may concern:*

Be it known that I, FORREST R. JONES, a citizen of the United States, residing at Knoxville, in the county of Knox and State of Tennessee, have invented new and useful Improvements in Methods of Indexing in Gear Cutting, of which the following is a specification.

In one generative method of cutting the teeth of gear wheels, a rolling motion of the cutter and gear blank relative to each other is effected, and during this rolling motion, or during the time intervals between intermittent increments of the rolling motion, the cutter removes material from the blank. This is followed by indexing so as to bring the blank and cutter into new positions relative to each other. The rolling and cutting are then repeated and followed again by indexing, and so on till the forming of all of the teeth on the blank is completed.

The ordinary methods of indexing are such that more or less complicated mechanism is required, and, as is usual in such mechanism, inaccuracy of the teeth is apt to occur, due to various causes in the indexing mechanism, such as elastic yielding, lost motion or play, and wear.

The object of this invention is to provide a method of rolling a gear blank and cutter relative to each other, and of indexing, which method can be applied through a mechanism of fewer parts and simpler form than ordinarily used.

The accompanying drawings diagrammatically illustrate one method of indexing according to my method.

Figure 1:
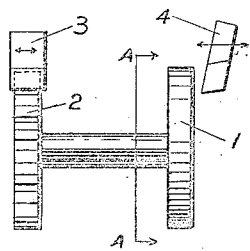
Fig. 1 shows the essential parts in position for cutting.
Figure 3:
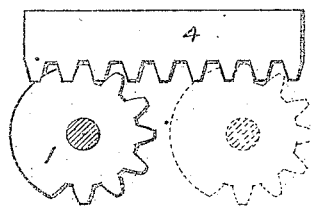
Fig. 3 is a sectional view, on the line A—A, looking in the direction of the arrows at the ends of the line, showing the section and the parts back of the section. In this figure, the partly cut blank is shown by full lines in its position relative to the cutter just before indexing begins, and by dotted lines in its position just after indexing is completed.
Figure 4:
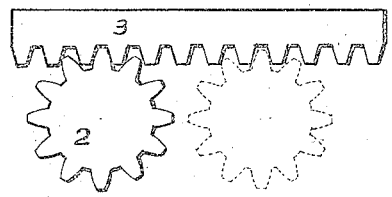

Fig. 4 shows the relative positions of the rack and gear corresponding to those of the blank and cutter in Fig. 3. Referring to Fig. 1; the blank 1 to be cut is rigidly connected to the gear 2 which meshes with the rack 3. The cutter 4 is adapted to reciprocate across the face of the blank, as indicated by the arrowheads. By rolling the gear along the rack so that each point in the axis of the gear has a rectilinear motion in a direction perpendicular to the plane of the paper and parallel to the length of the rack, the blank is caused to have a rolling motion relative to the cutter similar to that of the gear relative to the rack. The cutter, by its reciprocating motion, cuts tooth spaces in the blank.

Figure 2:
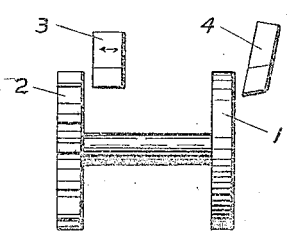
Fig. 2 shows the same parts in position for indexing.

After the rolling has carried the partly cut blank to the full-line position shown in Fig. 3, and the gear to the corresponding full-line position shown in Fig. 4, then the reciprocating motion cutter is stopped with the cutter free of the blank, and the rack is moved to a position out of mesh with the gear as shown in Fig. 2.

The gear and blank are then moved back (toward the right in Figs. 3 and 4), without rotation, through a distance equal to, or approximately equal to, the spacing, or a multiple of the spacing, of the rack teeth. The rack is then moved back into exactly its initial position relative to the cutter. This brings the blank into correct position relative to the cutter.

If the gear and partly-cut blank are moved back, in the manner described, through a distance greater than the rack-tooth spacing, or than a multiple of the spacing, then the placing of the rack back into its initial position will cause, or necessitate, a rotative motion of the gear and blank in a counter-clockwise direction (referring to Figs. 3 and 4), at the completion of which the blank will be in correct position relative to the cutter. This property of not requiring the gear and blank to be moved to an exact position before the rack begins to enter into mesh with the gear, is an important feature of my method of indexing, since the accuracy of indexing depends finally only upon the gear and rack.

Although only a rack-type cutter is shown and described herein, the method of indexing is also applicable to a cutter having only one cutting end when the number of teeth in the rack is equal to, or a multiple of, the number of teeth to be cut in the blank.

What I claim is:

1. In the cutting of gears with a cutter relative to which the gear blank is rolled, the hereindescribed method of effecting the required movement of the blank relative to the cutter, the method consisting of first rolling a gear along a rack, then disengaging the rack from the gear and moving the latter back, without rotation, along the rack through a distance approximately equal to a multiple of the tooth spacing of the rack, then re-engaging the rack and gear.

2. In the cutting of gears with a rack-type cutter along which the gear blank is rolled through part of a revolution to such an extent that some of the tooth spaces are only partly cut, then moved back so that a new cutting end operates in each partly-cut space, the hereindescribed method of effecting the required movement of the blank by rolling a gear along a rack, disengaging the rack from the gear and moving the latter back alongside the rack without rotation through a linear distance approximately equal to its circular pitch, re-engaging the rack and gear giving the latter only such slight rotation as may be necessary to permit such re-engagement and then again rolling the gear along the rack.

In testimony that I claim the foregoing as my invention, I have signed my name in presence of two subscribing witnesses.

FORREST R. JONES.

Witnesses:
SIDNEY BIRKNER,
JOHN PANKRATZ.